Patented Mar. 13, 1951

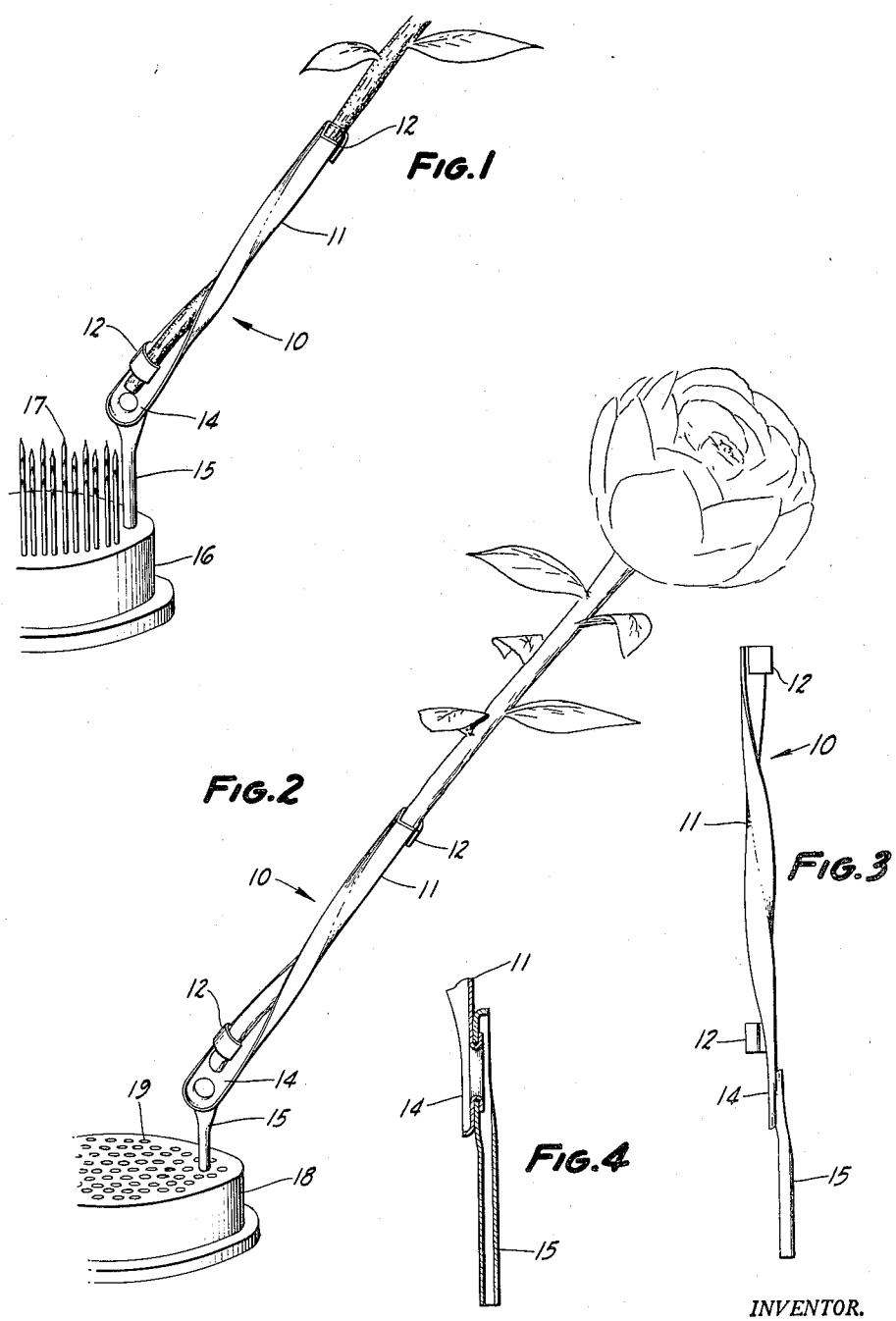

2,545,383

UNITED STATES PATENT OFFICE 2,545,383

STEM SUPPORT FOR ARTISTIC FLOWER ARRANGEMENTS

George P. Regan, San Francisco, Calif.

Application November 18, 1946, Serial No. 710,445

4 Claims. (Cl. 47—41)

This invention relates to devices for receiving and supporting flowers in artistic arrangements in bowls.

It is the principal object of my present invention to provide an improved device for mounting flowers, by means of which device artistic arranging of cut flowers can be expeditiously accomplished with assurance that the flowers will firmly remain in arranged condition.

It is a further object of my invention to provide a device of the character referred to which may be easily applied to a flower stem to firmly grip the same prior to the arranging thereof, and which may be quickly assembled on a conventional bowl frog or other flower mounting or supporting device and the flower thereafter firmly arranged in any desired position.

One form which the invention may assume is exemplified in the following description and illustrated by way of example in the accompanying drawings, in which:

Fig. 1 is a perspective view showing the pin type of frog and the manner of mounting my improved device thereon.

Fig. 2 is a view of a socket type of frog with my improved device mounted thereon and also disclosing it supporting a flower stem.

Fig. 3 is a view in elevation of my improved device.

Fig. 4 is a fragmentary view in central section through the pivotal connection of the stem holder and the spindle.

Referring more particularly to the accompanying drawings, 10 indicates a device for use in artistically arranging flowers in a bowl and, in effect, is a form of connector between the flower stem and a frog for use in the bowl. The device, when mounted on a frog, is capable of universal movement and of assuming and maintaining an adjusted position so as to enable the flowers to be artistically disposed to suit the arranger's taste.

The device comprises an elongated channeled stem holder 11 which, in this instance, is substantially of V-shaped cross-section with the legs of the V approximately ninety degrees apart. The dimensions of the channeled holder are sufficient so that an ordinary flower stem, within a considerable range, may nest therein.

At opposite ends the stem holder 11 is formed with retaining clips 12. Each clip is formed by extending a narrow tab from one toe of the channeled holder 11 and bending such tab semi-circularly over the channeled portion of the holder to a point in register with but short of the edge of the opposite toe of the channeled holder. The tabs forming the two clips 12 extend from opposite toes of the channeled holder 11, as illustrated.

To insure firm gripping of a stem and to prevent longitudinal movement between the stem and the holder when the latter is mounted on a flower stem, the channeled holder 11 is twisted longitudinally through an arc of approximately 180°. The stem of the flower, of course, is threaded into the channel beneath the clips 12, and by being twisted to follow the contour of the channel, it firmly and frictionally engages the channel so as to prevent inadvertent longitudinal relative movement therebetween. Obviously, when the stem is threaded through the upper clip and then twisted about the holder in the channel, and then engaged by the other clip 12, a firm connection is established between the stem holder 11 and the stem of the flower, and the latter will be unlikely to move relative to the holder.

One end of the stem holder 11 is flattened as at 14 and is pivotally connected to a mounting spindle 15. The formation of the pivotal connection is most clearly illustrated in Fig. 4. By this type of pivotal connection, sufficient friction is created between the two parts so that the stem holder 11 will yieldably remain in any set angular position relative to the spindle, even when supporting a flower. The free end of the spindle, or that opposite the pivotal connection thereof with the stem holder 11, is hollow and cylindrical with its lower end open.

I intend that when the device is for use with a frog such as shown in Fig. 1, having upstanding pins thereon, that the spindle act as a socket receiving such a pin, forming a rotatable connection between the spindle and the pin. In the event that the user employs frogs having sockets therein, the spindle 15 may be inserted in such socket and will, of course, be rotatable therein.

By enabling the spindle to rotate on the frog about a substantially vertical axis and permitting pivotal movement of the holder about an axis perpendicular to the axis of rotation of the spindle, it is obvious that a universal adjustment of the stem holder 11 relative to the frog can be accomplished.

In use of the device, it is constructed substantially as illustrated and described and the stem of a flower is projected longitudinally of the stem holder 11 following the formation thereof and being engaged exteriorly by the clips 12. The spindle is then mounted on the frog either by telescoping the spindle over the upstanding pin of one type of frog, or by inserting the spindle in the socket of another type of frog. The frogs in the drawings are indicated by the numeral 16, the pins of the pin type being shown in Fig. 1 and indicated by the numeral 17. In Fig. 2, I have shown a conventional frog 18 having vertically disposed sockets 19.

Thereafter, the arranger may adjust the position of the stem holder 11 by rotating the spindle and by angularly adjusting the stem holder 11 relative to the spindle 15. This will enable the arranger to adjust the position of the flower to the precise desired position. Obviously, the flower will firmly remain in such set position because of the construction of the device as previously described.

It is manifest that my device can be produced very inexpensively and can be utilized to expeditiously create artistic arrangements of flowers.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A device of the character described comprising a spindle adapted to rotatably engage a frog and be supported thereby, and an elongated stem holder pivotally connected at one end to one end of said spindle on an axis perpendicular to the axis of rotation of the spindle.

2. A device of the character described comprising a spindle adapted to rotatably engage a frog and be supported thereby, an elongated stem holder pivotally connected at one end to one end of said spindle on an axis perpendicular to the axis of rotation of the spindle, said elongated stem holder being channeled in cross-section, and clips disposed one at each end of the stem holder for engaging a stem disposed longitudinally thereof.

3. As an article of manufacture, a flower mounting device comprising a hollow spindle adapted to rotatably engage a frog and be supported thereby at one end, an elongated channeled stem holder pivotally connected at one end to the other end of said spindle on an axis perpendicular to the longitudinal axis of the spindle, said elongated stem holder being channeled in cross-section and being longitudinally twisted through an arc greater than ninety degrees, and clip means at opposite ends of the channeled holder to retain a stem in said channeled stem holder.

4. A device of the character described comprising a spindle being tubular at one end, an elongated stem holder pivotally connected at one end to the other end of the spindle on an axis disposed at ninety degrees to the longitudinal axis of the tubular portion of the spindle, said stem holder being channeled and substantially V-shaped in cross-section and twisted longitudinally through an arc greater than ninety degrees, and retaining clips at opposite ends of the channeled holder overlying the channel thereof to engage a stem disposed in said channel and retain it therein.

GEORGE P. REGAN.

REFERENCES CITED

The following references are of record in the file of this patent:

UNITED STATES PATENTS

| Number | Name | Date |
| --- | --- | --- |
| 255,404 | Altman | Mar. 28, 1882 |
| 450,510 | Heuser | Apr. 14, 1891 |
| 903,429 | Zuckriegel | Nov. 10, 1908 |
| 1,026,969 | Tygert | May 21, 1912 |
| 1,770,962 | Westheimer | July 22, 1930 |
| 2,333,561 | Hamblin | Nov. 2, 1943 |